(12) United States Patent
Thiria et al.

(10) Patent No.: US 11,884,847 B2
(45) Date of Patent: Jan. 30, 2024

(54) HIGHLY STRETCHABLE ADHESIVE SILICONE COMPOSITIONS AND USES THEREOF AS SEALING/BONDING AGENTS

(71) Applicant: Elkem Silicones USA Corp., East Brunswick, NJ (US)

(72) Inventors: Remi Thiria, Fort Mill, SC (US); Brian Price, Rock Hill, SC (US); Chris Carpen, Charlotte, NC (US); Phylandra Gaither, Fort Mill, SC (US)

(73) Assignee: ELKEM SILICONES USA CORP., East Brunswick, NJ (US)

( * ) Notice: Subject to any disclaimer, the term of this patent is extended or adjusted under 35 U.S.C. 154(b) by 542 days.

(21) Appl. No.: 17/167,610

(22) Filed: Feb. 4, 2021

(65) Prior Publication Data

US 2021/0246312 A1   Aug. 12, 2021

Related U.S. Application Data

(60) Provisional application No. 62/971,049, filed on Feb. 6, 2020.

(51) Int. Cl.

| | |
|---|---|
| *C09J 183/04* | (2006.01) |
| *B32B 7/09* | (2019.01) |
| *B32B 5/26* | (2006.01) |
| *B32B 7/12* | (2006.01) |
| *B60R 21/235* | (2006.01) |
| *C08L 83/04* | (2006.01) |

(52) U.S. Cl.
CPC .............. *C09J 183/04* (2013.01); *B32B 5/26* (2013.01); *B32B 7/09* (2019.01); *B32B 7/12* (2013.01); *B60R 21/235* (2013.01); *C08L 83/04* (2013.01); *B32B 2605/00* (2013.01); *B60R 2021/23514* (2013.01); *B60R 2021/23538* (2013.01)

(58) Field of Classification Search
CPC combination set(s) only.
See application file for complete search history.

(56) References Cited

U.S. PATENT DOCUMENTS

| | | | |
|---|---|---|---|
| 5,193,847 A | 3/1993 | Nakayama | |
| 6,811,650 B2 | 11/2004 | Takuman et al. | |
| 8,431,647 B2 * | 4/2013 | Dumont | ................ C09J 183/04 |
| | | | 524/588 |
| 2022/0282142 A1 * | 9/2022 | Degroot, Jr. | ............... C09J 7/29 |

FOREIGN PATENT DOCUMENTS

| | | | |
|---|---|---|---|
| EP | 0131854 B | | 1/1985 |
| EP | 361921 | * | 9/1995 |
| EP | 2700690 A1 | | 2/2014 |
| WO | WO 2008/0847747 | * | 7/2008 |
| WO | 2013/137472 A1 | | 9/2013 |

OTHER PUBLICATIONS

International Search Report and Written Opinion of International Patent Application No. PCT/US2021/016553, dated May 19, 2021.

* cited by examiner

*Primary Examiner* — Marc S Zimmer
(74) *Attorney, Agent, or Firm* — McBee Moore & Vanik IP, LLC

(57) ABSTRACT

A curable silicone adhesive having improved elongation-at-break and adhesive properties to various substrates, in particular synthetic textiles used in the manufacture of air bags, to be used, for example, as a joint sealer. These silicone compositions provide excellent adhesive properties such as peel strength and cohesive failure when used to seal joints/seams between two pieces of textile fabric. Airbag fabrics using such novel addition curable adhesive silicone compositions are also provided.

20 Claims, No Drawings

HIGHLY STRETCHABLE ADHESIVE SILICONE COMPOSITIONS AND USES THEREOF AS SEALING/BONDING AGENTS

CROSS-REFERENCE TO RELATED APPLICATIONS

This application is a non-provisional U.S. patent application which claims priority to U.S. Provisional Application No. 62/971,049, filed 6 Feb. 2020. The disclosure of the priority application is incorporated in its entirety herein by reference.

FIELD OF THE INVENTION

The present invention relates to novel addition curable silicone compositions having excellent self-adhesive properties and very high elongation-at-break properties when applied to and cured on textile fabrics.

These silicone compositions provide excellent adhesive properties such as peel strength and cohesive failure when used to seal joints/seams between two pieces of textile fabric.

Airbag fabrics using such novel addition curable adhesive silicone compositions are also encompassed by the invention.

BACKGROUND OF THE INVENTION

At the present time, many motor vehicles are equipped with an acceleration sensor that measures the decelerations of the vehicle. When the reference deceleration value is exceeded, an explosive pellet triggers the combustion of an additional charge, and then that of the combustible solid. This solid is converted into gas (for example nitrogen) and inflates the cushion. An airbag (or inflatable cushion) is an air-filled bag made of pleated and tight-stitched fabric. For further details regarding these personal protection bags or "airbags", reference may be made especially to reference U.S. Pat. No. 5,193,847.

Traditionally, airbags are formed of a cloth made of synthetic fiber, for example of polyamide, and are produced in a single, piece, or from two pieces assembled for example by adhesive bonding or by sewing by means of a polyamide thread. The outer face of the airbags produced in a single piece is generally coated with a crosslinked silicone elastomeric film forming a protective and mechanically reinforcing coating, whereas, in the case of airbags made from two parts sewn together, the silicone elastomeric film is provided on the inner face of the airbag. Assembly by sewing engenders certain disadvantages, since the pricks of the needles in the silicone elastomeric film and the cloth constitute holes in the region of the stitching, which may prejudice the leakproof properties and resistance to chemical, thermal and climatic attack.

While fabrics coated with conventional silicone compositions may be satisfactory for standard airbag applications, the airbag industry is now required to satisfy requirements where pressurized air is to be retained in a fabric envelope for a relatively long period. This requirement exists for example in the application of such coatings to side curtain airbags for the automotive industry. Curtain airbags are now designed to inflate as quickly as driver- and passenger-side bags, but they must deflate very slowly to protect the occupants during rollover and side impact. The side curtains unfold to form a cushioned curtain between passengers and some of the side of the car body, e.g., the windows. As the intention is not merely to cushion the blow on impact itself, as is the case for conventional driver and passenger airbags, but e.g. to protect passengers when a car is rolling, it is important that the side curtain air bag is sufficiently pressurized during such rolling process. Where conventional driver and passenger airbags only need to retain pressure for a fraction of a second, side curtain airbags must maintain a suitable, pressure for at least a few seconds.

One solution for this problem of leakproofing stitched areas of airbags consists of applying an adhesive joint in the region of the stitching. According to this known method, the parts of the airbag are cut out one above the other, a bead of adhesive is then deposited around one of the parts and the two parts are then compressed in order to create the joint. The bag with adhesive then passes to the "sewing" step of manufacture.

The adhesive used in this method is generally an adhesive silicone composition. Such an adhesive composition is deathbed for example in EP 0 131 854B and is capable of adhering two surfaces in a permanent manner. This composition is obtained by mixing:

(i) 9 to 70% by weight of a solid resinous copolymer, soluble in benzene, containing hydroxyl radicals, consisting essentially of $R_3SiO_{1/2}$ units and $SiO_{4/2}$ units where R is a monovalent hydrocarbon group containing less than 5 carbon atoms, at least 95% of the R groups in (i) being methyl groups, (ii) 30 to 91% by weight of a polydiorganosiloxane of formula $HO(R_2SiO)_aH$, where R is as defined above, and the mean value of a is such that the viscosity of (ii) is greater than 10; 000 Pa·s at 25° C., (iii) 0.75 to 8 parts based on 100 parts by weight of (i) and (ii), of an organohydrogenopolysiloxane compatible with the mixture of (i) and (ii) and having units of formula $R_bH_cSiO_{(4-b-c)/2}$ where R is as defined above, b lies between 1.00 and less than 2, c lies between 0.3 and 1.00, the sum of b+c lying between 1.30 and less than 3.00, more than 2 hydrogen atoms linked to silicon being present on average per molecule of (iii), no silicon atom bearing more than 1 hydrogen atom linked to silicon, the molar ratio of SiH units of (iii) to SiOH units of (i) and (ii) lying between 0.2/1 and 1/1 and the weight of hydrogen atoms present on the silicon being less than 0.05 g per 100 g of (i) and (ii), (iv) 0.5 to 2 parts by weight, based on 100 parts by weight of (i) and (ii) of a tin-based soluble catalyst, and (v) a sufficient quantity of non-reactive solvent for mixing (i), (ii), (iii) and (iv), in order to obtain an adhesive capable of flowing of which the viscosity and solid content are jointly such that a single application of the adhesive makes it possible to achieve an adhesive thickness of at least 0.1 mm.

The method described for applying this composition specifies a step of evaporating solvent, which increases the manufacturing time for a part, reduces production output, and generates safety and health hazards.

Moreover; the performances of this adhesive remain modest; in all cases not sufficient for this adhesive to be used in the field of assembly of airbags.

Now, in the special case of airbags; adhesives must be used having sufficient adhesive strength (e.g., peel strength, cohesive failure) and a high elongation-at-break. Indeed when the airbag opens, the fabric inflates very rapidly and deformation of the fabric in the region of the stitching is very high. This is particularly observed in side airbags, for which, contrary to the front and passenger airbags, the fabric in the region of the stitching is not folded inwards but outwards, due to the complex form of the bag.

The property of flexibility can be easily obtained. Stretchability, on the other hand, represents a more challenging type of mechanics, in which the systems must accommodate large strain deformation typically of arbitrary form, including not only bending but also twisting, stretching, compressing and others.

Elongation-at-break is the percentage increase in length that a material will achieve before breaking. This figure is shown as a percentage and is usually measured using standard test method ASTM D412. A higher percentage usually indicates a better-quality material when combined with a good tensile strength.

Other formulations have been developed in order to improve the mechanical properties of the adhesives. Notably, U.S. Pat. No. 6,811,650 describes an adhesive composition that comprises:
- A. 100 parts by weight of an organopolysiloxane having an average of two or more alkenyl groups per molecule;
- B. an organopolysiloxane having an average of two or more silicon bonded hydrogen atoms in each molecule, in an amount such that the molar ratio of silicon bonded hydrogen atoms in component B to alkenyl groups in component A is from 0.01 to 20;
- C. from 5 to 200 parts by weight of a precipitated calcium carbonate powder selected from the group consisting of: (i) calcium carbonate treated with an organic acid and, (ii) calcium carbonate treated with an ester of an organic acid, said calcium carbonate powder having a BET specific surface area of from 5 to 50 $m^2/g$; and
- D. a platinum-based catalyst, in an amount sufficient to effect curing of the composition.

This composition makes it possible to obtain an adhesive having a tensile strength of 3.5 MPa (JISK6251 test) and an elongation-at-break of 1500% However, it is indicated that this composition is allowed to harden for 7 days at 25° C. in order to obtain the adhesive having the desired properties in elongation and tensile strength. It is quite obvious that it is not possible in industrial production to consider such a crosslinking time.

Methods for adhesively bonding at least two substrates using a crosslinkable adhesive silicone composition were described in U.S. Pat. No. 8,431,647, the compositions comprising:
- (A) at least one polyorganosiloxane POS (A) having, per molecule, at least two alkenyl groups,
- (B) at least one polyorganosiloxane crosslinking agent having, per molecule, at least two hydrogen atoms linked to silicon,
- (C) a catalytically effective quantity of at least one catalyst based on at least one metallic compound, and
- (D) a reinforcing filler,
  characterized in that it also includes at least one polyorganosiloxane gum POS (A') different from POS (A), having a content by weight of an alkenyl group or groups of between 0.001 and 0.2% and having, at 25° C., a consistency of between 300 and 1200.

The mechanical properties of the above composition, in terms of adhesive strength (34 N/cm peel strength) and elongation-at-break (1180%) are acceptable for producing adhesive joints in the region of airbag stitching. However, there is a need for adhesive silicone compositions with improved mechanical properties, e.g., greater adhesive strength combined with greater elongation-at-break for use as joint sealers in airbags, particularly in side airbags in which a leakproof seal must be maintained for several seconds.

BRIEF SUMMARY OF THE INVENTION

As a result of diligent research, the inventors of the present invention found that it was possible to solve the above-mentioned problems by using an addition curable silicone adhesive composition X which, when cured, yields a highly stretchable silicone elastomeric adhesive Z having an elongation-at-break value of at least 1200%, preferably at least 1500%, measured according to ASTM D-412 and having a peel strength of at least 40 N/cm.

The addition curable silicone adhesive composition X can be used to adhesively bond two substrates, for example, two substrates assembled by sewing, constituting an inflatable bag for the protection of an occupant of a vehicle.

Methods for adhesively bonding at least two substrates are also provided comprising applying the addition curable silicone adhesive composition X to at least one surface of one or more of the at least two substrates to form at least one adhesively-coated surface and assembling the substrates such that the at least one adhesively-coated surface contacts the at least two substrates thereby forming an adhesive bond between the at least two substrates.

Airbag fabrics using the addition curable silicone adhesive composition X are also provided.

DETAILED DESCRIPTION OF THE INVENTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As used herein, the term "silicone rubber" includes the crosslinked product of any crosslinkable silicone composition. The terms "silicone rubber" and "silicone elastomer" may be used interchangeably.

As used herein, the terms "crosslinked" and "cured" may be used interchangeably and refer to the reaction that occurs when the components of the curable silicone composition are combined and allowed to react, resulting in the cured silicone elastomer.

As used herein, the term "alkenyl" is understood to mean an unsaturated, linear or branched hydrocarbon chain, substituted or not, having at least one olefinic double bond, and more preferably a single double bond. Preferably, the "alkenyl" group has 2 to 10 carbon atoms and more preferably 2 to 6. This hydrocarbon chain optionally includes at least one heteroatom such as O, N, S. Preferred examples of "alkenyl" groups are vinyl, allyl and homoallyl groups, vinyl being particularly preferred.

As used herein, "alkyl" denotes a saturated, linear or branched hydrocarbon chain, possibly substituted (e.g. with one or more alkyls), with preferably 1 to 10 carbon atoms, for example 1 to 8 carbon atoms and better still 1 to 4 carbon atoms. Examples of alkyl groups are notably methyl, ethyl, isopropyl, n-propyl, tert-butyl, isobutyl, n-butyl, n-pentyl, isoamyl and 1,1-dimethylpropyl.

To achieve the objective of obtaining a highly stretchable silicone adhesive (i.e., a silicone adhesive having an elongation-at break value of at least 1200%) and a peel strength of at least 40 N/cm, the Applicant demonstrated that the combination of (A) an alkenyl group-containing organopolysiloxane A having at least two silicon-bonded alkenyl groups per molecule, (B) at least one diorganohydrogensiloxy-terminated diorganopolysiloxane chain extender CE, (C) at least one diorganoalkenylsiloxy-terminated diorganopolysiloxane gum crosslinker Alk-XL containing at least 3 silicon-bonded alkenyl groups per molecule, and optionally (D) at least one organosilicon crosslinker H-XL containing at least three hydrogen atoms per molecule in such amounts to result in: 1) the molar ratio of hydrogen atoms to alkenyl groups within the silicone adhesive (RHalk) are between 1.05 and 1.40; 2) the percentage of number of moles of hydrogen atoms directly bonded to a silicon atom in CE out of the number of moles of hydrogen atoms directly bonded to a silicon atom in both CE and H-XL combined (RHCE) is between 90% and 100%; and 3) the percentage of number of moles of alkenyl groups directly bonded to a silicon atom in A out of the total number of moles of alkenyl groups directly bonded to a silicon atom in the composition (RAlkA) is between 80% and 95% makes it possible to overcome problems that were not solved by the prior art.

In particular, the addition curable silicone adhesive X comprises:
(A) at least one alkenyl group-containing organopolysiloxane A having at least two silicon-bonded $C_2$ to $C_{20}$ alkenyl groups per molecule,
(B) at least one diorganohydrogensiloxy-terminated diorganopolysiloxane chain extender CE,
(C) at least one diorganoalkenylsiloxy-terminated diorganopolysiloxane gum crosslinker Alk-XL containing at least 3 silicon-bonded $C_2$ to $C_{20}$ alkenyl groups per molecule having a total alkenyl content of from 0.02 to 0.10 weight %,
(D) optionally, at least one organosilicon crosslinker H-XL containing at least 3 silicon-bonded hydrogen atoms per molecule,
(E) at least one addition reaction catalyst C,
(F) at least one reinforcing mineral filler F1,
(G) optionally, at least one complementary filler F2,
(H) optionally, at least one cure rate modifier G,
(I) optionally, at least one rheology modifier H,
(J) optionally, at least one adhesion promoter I, and
(K) optionally, at least one functional additive for conferring specific properties J.

As discussed above, the amounts of A, CE, Alk-XL, and optionally H-XL, included in the curable silicone adhesive composition X are preferably selected to result in: 1) the molar ratio of hydrogen atoms to alkenyl groups within the silicon elastomer (RHalk) is between 1.05 and 1.40; 2) the percentage of hydrogen atoms directly bonded to a silicon atom in CE out the number of moles of hydrogen atoms directly bonded to a silicon atom in both CE and H-XL combined (RHCE) is between 90 and 100%; and 3) the percentage of number of moles of alkenyl groups directly bonded to a silicon atom in A out of the total number of moles of alkenyl groups directly bonded to a silicon atom in the total composition (RAlkA) is between 80% and 95%.

The curable silicone adhesive composition X may be prepared by merely mixing the ingredients in the desired ratios. However, for reasons of storage stability and bath life before or during application of the compositions to the substrate(s), it is preferred to store the composition X in two parts A and B, by separating the curing catalyst (C) from the diorganopolysiloxanes (CE) or the optional organosilicon crosslinker (H-XL) which bear hydrogen substituents. The other components of the compositions X are often distributed over both parts in proportions which will allow easy mixing of the two parts immediately prior to application. Such easy mixing ratios may be e.g., 1/10 or 1/1 ratios.

Preferably, two-part curable liquid silicone adhesive compositions of the invention comprise a first liquid composition comprising components A, Alk-XL, and C, but not CE and not H-XL; and a second liquid composition comprising components A, Alk-XL, CE, and optionally H-XL, but not C.

Once mixed together, the parts A and B form a ready-to-use silicone adhesive composition, which may be applied to the substrate by any suitable means so as to obtain an adhesive having a thickness of at least 0.3 mm.

The curable silicone adhesive composition X yields, when cured, a silicone adhesive elastomer Z having an elongation-at-break value of at least 1200% measured according to ASTM D-412. In some embodiments, the curable silicone adhesive composition X yields, when cured, a silicone adhesive elastomer Z having an elongation-at-break value of at least 1300%, at least 1400%, at least 1500%, at least 1600%, at least 1700%, at least 1800%, at least 1900%, or at least 2000% measured according to ASTM D-412.

ASTM D412 measures the elasticity of a material while under tensile strain, as well as its behavior after testing when the material is no longer being stressed. Though ASTM D412 measures many different properties, the following are the most common:
Tensile Strength: the maximum tensile stress applied in stretching a specimen to rupture.
Tensile Stress at a Given Elongation: the stress required to stretch the uniform cross-section of a test specimen to a given elongation.
Ultimate Elongation: the elongation at which rupture occurs in the application of continued tensile stress.
Tensile Set: the extension remaining after a specimen has been stretched and allowed to retract in a specified manner, expressed as a percentage of the original length.

The curable silicone adhesive composition X of the invention comprises at least one alkenyl group-containing organopolysiloxane A having at least two silicon-bonded alkenyl groups per molecule. In some embodiments, the curable silicone adhesive composition X of the invention comprises more than one alkenyl group-containing organopolysiloxane A having at least two silicon-bonded alkenyl groups per molecule. For example, the curable silicone adhesive composition X of the invention may comprise two alkenyl group-containing organopolysiloxanes A (A1 and A2) each having at least two silicon-bonded alkenyl groups per molecule.

In some embodiments, the at least one alkenyl group-containing organopolysiloxane A comprises:
two siloxy units of formula (A-1):

$$(Alk)(R)_2SiO_{1/2} \tag{A-1}$$

in which: the symbol "Alk" represents a $C_2$ to $C_{20}$ alkenyl group, such as a vinyl, allyl, hexenyl, decenyl, or tetradecenyl group, preferably a vinyl group, and the symbol R represents a $C_1$ to $C_{20}$ alkyl group, such as a methyl, ethyl, propyl, or a $C_6$ to $C_{12}$ aryl group such as a xylyl, tolyl or phenyl group, preferably a methyl group, in which each instance of "Alk" and "R" can be the same or different, and other siloxy units of formula (A-2):

in which the symbol L represents a $C_1$ to $C_{20}$ alkyl group, such as a methyl, ethyl, propyl, or a $C_6$ to $C_{12}$ aryl group such as a xylyl, tolyl or phenyl group, preferably a methyl group, and the symbol g is equal to 0, 1, 2 or 3, in which each instance of L can be the same or different.

In some preferred embodiments, the at least one alkenyl group-containing organopolysiloxane A is of the following formula (1):

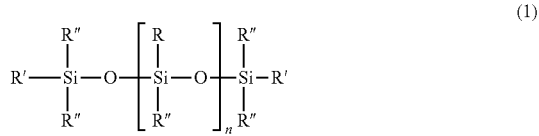

in which:
n is an integer ranging from 1 to 1000, preferably from 50 to 1000,
R is independently selected from a $C_1$ to $C_{20}$ alkyl group, such as a methyl, ethyl, propyl, or a $C_6$ to $C_{12}$ aryl group such as a xylyl, tolyl, or phenyl group, preferably a methyl group, or a $C_2$ to $C_{20}$ alkenyl group, such as a vinyl, allyl, hexenyl, decenyl, or tetradecenyl group, preferably a vinyl group,
R' is independently selected from a $C_2$ to $C_{20}$ alkenyl group, such as a vinyl, allyl, hexenyl, decenyl, or tetradecenyl group, preferably a vinyl group, and
R" is independently selected from a $C_1$ to $C_{20}$ alkyl group, such as a methyl, ethyl, propyl, or a $C_6$-$C_{12}$ aryl group such as a xylyl, tolyl, or phenyl group, preferably a methyl group.

In a preferred embodiment, the at least one alkenyl group-containing organopolysiloxane A is one or more α,ω-vinyl polydimethylsiloxane(s), more preferably, one or more linear α,ω-vinyl polydimethylsiloxane(s).

In some embodiments, the viscosity of the at least one alkenyl group-containing organopolysiloxane A is between about 50 to about 100,000 mPa·s., preferably between about 500 to about 50,000 mPa·s., more preferably between about 1,000 to about 25,000 mPa·s. In some embodiments, the curable silicone adhesive compositions X of the invention comprise at least one alkenyl group-containing organopolysiloxane A1 having a viscosity between about 5,000 to about 100,000 mPa·s and at least one alkenyl group-containing organopolysiloxane A2 having a viscosity between about 500 to about 10,000 mPa·s. In a preferred embodiment, the viscosity of the at least one alkenyl group-containing organopolysiloxane A1 is between about 7,500 to about 50,000 mPa·s., more preferably between about 10,000 to about 25,000 mPa·s. In a preferred embodiment, the viscosity of the at least one alkenyl group-containing organopolysiloxane A2 is between about 500 to about 7,500 mPa·s., more preferably between about 1,000 to about 5,000 mPa·s.

All the viscosities under consideration in the present specification correspond to a dynamic viscosity magnitude that is measured, in a manner known per se, at 25° C., using a Brookfield viscosimeter, model RV or RVT. As regards to fluid products, the viscosity under consideration in the present specification is the dynamic viscosity at 25° C., known as the "Newtonian" viscosity, i.e. the dynamic viscosity that is measured, in a manner known per se.

In some embodiments, the molecular weight of the at least one alkenyl group-containing organopolysiloxane A is between about 1,000 g/mol to about 80,000 g/mol, preferably between about 5,000 g/mol to about 70,000 g/mol, more preferably between about 10,000 g/mol to about 60,000 g/mol. In some embodiments, the curable silicone adhesive compositions X of the invention comprise at least one alkenyl group-containing organopolysiloxane A1 having a molecular weight between about 5,000 to about 80,000 g/mol and at least one alkenyl group-containing organopolysiloxane A2 having a viscosity between about 1,000 to about 50,000 g/mol. In a preferred embodiment, the molecular weight of the at least one alkenyl group-containing organopolysiloxane A1 is between about 15,000 to about 75,000 g/mol, more preferably between about 30,000 to about 60,000 g/mol. In a preferred embodiment, the molecular weight of the at least one alkenyl group-containing organopolysiloxane A2 is between about 5,000 to about 40,000 g/mol, more preferably between about 10,000 to about 30,000 g/mol.

The at least one alkenyl group-containing organopolysiloxane A is preferably linear.

The curable silicone adhesive composition X of the invention further comprises at least one diorganohydrogensiloxy-terminated diorganopolysiloxane chain extender CE. The at least one diorganohydrogensiloxy-terminated diorganopolysiloxane chain extender CE can be included in the curable silicone adhesive composition X in an amount from about 0.1% to about 20%, preferably from about 0.5% to about 15%, preferably from about 0.5% to about 10% by weight of the total composition.

In some embodiments, the diorganohydrogensiloxy-terminated diorganopolysiloxane CE is of the following formula (2):

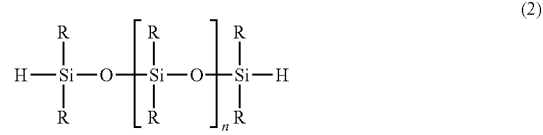

in which:
R is independently selected from a $C_1$ to $C_{20}$ alkyl group or a $C_6$ to $C_{12}$ aryl group such as a xylyl, tolyl, or phenyl group, preferably R is independently selected from the group consisting of: methyl, ethyl, propyl, and aryl, and most preferably R is methyl, and
n is an integer ranging from 1 to 500, preferably from 2 to 100, and more preferably from 3 to 50.

In some embodiments, the viscosity of the at least one diorganohydrogensiloxy-terminated diorganopolysiloxane CE is between about 1 to about 500 mPa·s., preferably between about 2 to about 100 mPa·s., more preferably between about 4 to about 50 mPa·s. or between about 5 to about 20 mPa·s.

In some embodiments, the molecular weight of the at least one diorganohydrogensiloxy-terminated diorganopolysiloxane CE is between about 100 to about 5,000 g/mol, preferably between about 250 to about 2,500 g/mol, more preferably between about 500 to about 1,000 g/mol.

The curable silicone adhesive composition X of the invention further comprises at least one diorganoalkenylsiloxy-terminated diorganopolysiloxane gum crosslinker Alk-XL containing at least 3 silicon-bonded alkenyl groups per molecule that is different from the at least one alkenyl group-containing organopolysiloxane A. In particular, the at least one diorganoalkenylsiloxy-terminated diorganopolysiloxane gum crosslinker Alk-XL containing at least 3 silicon-bonded alkenyl groups per molecule has a total alkenyl content of from 0.02 to 0.10 weight %. In some embodiments, the at least one diorganoalkenylsiloxy-terminated diorganopolysiloxane gum crosslinker Alk-XL containing at least 3 silicon-bonded alkenyl groups per molecule has a total alkenyl content of from 0.02 to 0.065 weight %. In some embodiments, the at least one diorganoalkenylsiloxy-terminated diorganopolysiloxane gum crosslinker Alk-XL containing at least 3 silicon-bonded alkenyl groups per molecule has a total alkenyl content of from 0.04 to 0.06 weight %.

In a general manner, the at least one diorganoalkenylsiloxy-terminated diorganopolysiloxane gum crosslinker Alk-XL can be defined in the same manner as the at least one alkenyl group-containing organopolysiloxane A and advantageously comprises:

at least three siloxy units of formula (A-3):

in which: the symbol "Alk" represents a $C_2$ to $C_{20}$ alkenyl group, such as a vinyl, allyl, hexenyl, decenyl, or tetradecenyl group, preferably a vinyl group, and the symbol R represents a $C_1$ to $C_{20}$ alkyl group, such as a methyl, ethyl, propyl, or a $C_6$ to $C_{12}$ aryl group such as a xylyl, tolyl, or phenyl group, preferably a methyl group, in which each instance of "Alk" and R can be the same or different, and in which "h" equals 1 or 2, and other siloxy units of formula (A-2):

in which the symbol L represents a $C_1$ to $C_{20}$ alkyl group, such as a methyl, ethyl, propyl, or a $C_6$ to $C_{12}$ aryl group such as a xylyl, tolyl, or phenyl group, preferably a methyl group, and the symbol g is equal to 2, in which each instance of L can be the same or different.

In some preferred embodiments, the at least one diorganoalkenylsiloxy-terminated diorganopolysiloxane gum crosslinker Alk-XL is of the following formula (1):

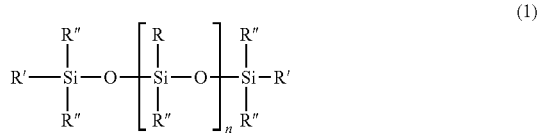

in which:
n is an integer ranging from 1000 to 10000, preferably from 2000 to 5000,
R is independently selected from a $C_1$ to $C_{20}$ alkyl group, such as a methyl, ethyl, propyl, or a $C_6$ to $C_{12}$ aryl group such as a xylyl, tolyl, or phenyl group, preferably a methyl group, or a $C_2$ to $C_{20}$ alkenyl group, such as a vinyl, allyl, hexenyl, decenyl, or tetradecenyl group, preferably a vinyl group,
R' is independently selected from a $C_2$ to $C_{20}$ alkenyl group, such as a vinyl, allyl, hexenyl, decenyl, or tetradecenyl group, preferably a vinyl group, and R" is independently selected from a $C_1$ to $C_{20}$ alkyl group, such as a methyl, ethyl, propyl, or a $C_6$ to $C_{12}$ aryl group such as a xylyl, tolyl, or phenyl group, preferably a methyl group.

Preferably, the organopolysiloxane chain of the gum Alk-XL is blocked at each end by vinyl groups.

In some embodiments, the alkenyl groups of the gum Alk-XL are distributed randomly on the organopolysiloxane chain of said gum with the exception of the ends.

In a preferred embodiment, the at least one diorganoalkenylsiloxy-terminated diorganopolysiloxane gum crosslinker Alk-XL is a dimethylvinylsiloxy-terminated copolymer of methylvinylsiloxane and dimethylsiloxane.

It is obvious that these various types of gum Alk-XL may be combined.

In some embodiments, the at least one diorganoalkenylsiloxy-terminated diorganopolysiloxane gum crosslinker Alk-XL is a homopolymer or copolymer having at least three alkenyl groups per molecule and having a viscosity of greater than 500,000 mPa·s at 25° C. In some embodiments, the viscosity of the at least one diorganoalkenylsiloxy-terminated diorganopolysiloxane gum crosslinker Alk-XL is greater than 1 million mPa·s at 25° C. In some embodiments, the at least one diorganoalkenylsiloxy-terminated diorganopolysiloxane gum crosslinker Alk-XL is greater than 10 million mPa·s at 25° C.

In some embodiments, the consistency of the at least one diorganoalkenylsiloxy-terminated diorganopolysiloxane gum crosslinker Alk-XL is between 300 and 1200 at 25° C., preferably between 500 and 1000 at 25° C., more preferably between 600 and 900 at 25° C.

The consistency or penetrability of a gum is determined at 25° C. by means of a penetrometer of PNR12 type or equivalent model which makes it possible to apply a cylindrical head, under standardized conditions, to the sample.

The penetrability of a gum is the depth, expressed in tenths of millimeters, to which a calibrated cylinder penetrates into the sample over the course of one minute.

To this end, a sample of gum is introduced into an aluminum bucket 40 mm in diameter and 60 mm in height. The bronze or brass cylindrical head measures 6.35 mm in diameter and 4.76 mm in height and is carried by a metal rod 51 mm long and 3 mm in diameter, which is suitable for the penetrometer. This rod is ballasted with an overload of 100 g. The total weight of the assembly is 151.8 g, including 4.3 g for the cylindrical part and its support rod. The bucket containing the sample of gum is placed in the bath thermostated at 25° C.±0.5° C. for a minimum of 30 min. The measurement is carried out according to the constructor's instructions. The values of the depth (V) in tenths of millimeters and the time (t) in seconds to achieve this depth are indicated on the apparatus. The penetrability is equal to 60 V/t expressed in tenths of millimeters per minute.

The at least one diorganoalkenylsiloxy-terminated diorganopolysiloxane gum crosslinker Alk-XL can be included in the curable silicone adhesive composition X in an amount from about 10% to about 40%, preferably from about 10% to about 30%, from about 15% to 30%, or from about 20% to about 30% by weight of the total composition.

The curable silicone adhesive composition X of the invention optionally comprises at least one organosilicon crosslinker H-XL containing at least 3 silicon-bonded hydrogen atoms per molecule. In some embodiments, the organosilicon crosslinker H-XL containing at least 3 silicon-bonded hydrogen atoms per molecule is an organohydrogenpolysiloxane comprising from 10 to 500 silicon atoms within each molecule, preferably from 10 to 250 silicon atoms within each molecule.

The optional organosilicon crosslinker H-XL can be included in the curable silicone adhesive composition X in an amount from about 0.01% to about 5%, preferably from about 0.05% to about 2%, preferably from about 0.1% to about 1% by weight of the total composition. According to one embodiment, the curable silicone adhesive composition X is free of organosilicon crosslinker H-XL.

In some embodiments, the organosilicon crosslinker H-XL is selected such that the ratio $\alpha$ (d/($\Sigma$Si)) is within the range $0.01 \leq \alpha \leq 0.957$, in which d=number of H atoms directly linked to a Si atom per molecule, and $\Sigma$Si is the sum of silicon atoms per molecule. In a preferred embodiment, the ratio $\alpha$ is within the range $0.10 \leq \alpha \leq 0.75$. In other preferred embodiments, the ratio $\alpha$ is within the range $0.15 \leq \alpha \leq 0.30$.

The organosilicon crosslinker H-XL preferably contains from 0.45 to 40% SiH by weight, more preferably from 0.5 to 35% SiH by weight, more preferably from 0.5% to 15% SiH by weight or from 3% to 13% SiH by weight.

In some embodiments, the organosilicon crosslinker H-XL comprises:
(i) at least 3 siloxy units of formula (XL-1) which may be identical or different:

$$(H)(Z)_e SiO_{(3-e)/2} \quad (XL-1)$$

in which:
H represents a hydrogen atom,
Z represents an alkyl having from 1 to 8 carbon atoms inclusive, and
e is equal to 0, 1 or 2;
and/or
(ii) at least one, and preferably from 1 to 550 of siloxy unit(s) of formula (XL-2):

$$(Z)_g SiO_{(4-g)/2} \quad (XL-2)$$

in which:
Z represents an alkyl having from 1 to 8 carbon atoms inclusive or a $C_6$ to $C_{12}$ aryl group such as a xylyl, tolyl, or phenyl group, preferably an alkyl, and
g is equal to 0, 1, 2 or 3.

In some embodiments, Z in XL-1 and/or XL-2 is selected from methyl, ethyl, and propyl groups, cycloalkyl groups, such as cyclohexyl, cycloheptyl or cyclooctyl groups, and aryl groups such as xylyl, tolyl and phenyl groups. Preferably, Z is a methyl group. However, Z in XL-1 and XL-2 may be the same or different.

In a preferred embodiment, e in XL-1 is 1 or 2.
In a preferred embodiment, g in XL-2 is 2.
In a preferred embodiment, the organosilicon crosslinker H-XL comprises from 3 to 60 siloxy units of formula (XL-1) and from 1 to 250 siloxy unit(s) of formula (XL-2).

The amounts of the alkenyl group-containing organopolysiloxane A, the diorganohydrogensiloxy-terminated diorganopolysiloxane CE, the diorganoalkenylsiloxy-terminated diorganopolysiloxane gum crosslinker Alk-XL, and the optional organosilicon crosslinker H-XL included in the curable silicone adhesive compositions X of the invention are determined such that 1) the molar ratio of hydrogen atoms to alkenyl groups within the silicon elastomer (RHalk) is between 1.05 and 1.40; 2) the percentage of hydrogen atoms directly bonded to a silicon atom in CE out the number of moles of hydrogen atoms directly bonded to a silicon atom in both CE and H-XL combined (RHCE) is between 90 and 100%; and 3) the percentage of number of moles of alkenyl groups directly bonded to a silicon atom in A out of the total number of moles of alkenyl groups directly bonded to a silicon atom in the composition X (RAlkA) is between 80% and 95%.

The molar ratio of hydrogen atoms to alkenyl groups (RHalk) can be determined using the formula:

RHalk=$n$H/$t$Alk, in which:
nH=number of moles of hydrogen atom directly bonded to a silicon atom in the curable silicone adhesive composition X, and
tAlk=number of moles of alkenyl groups directly bonded to a silicon atom in the curable silicone adhesive composition X.

The value of RHalk in the curable silicone adhesive compositions X of the invention is advantageously between 1.05 and 1.40. It has been determined that if the value of RHalk is less than 1.05, the resulting cured compositions Z are gel-like in structure. Similarly, if the value of RHalk is 1.40 or greater, the network of the resulting cured compositions Z is too tightly crosslinked and cohesive failure and elongation of the resulting cured compositions is inconsistent. Preferably, the value of RHalk in the curable silicone adhesive compositions X of the invention is 1.05<RHalk<1.40. Alternatively, the value of RHalk in the curable silicone adhesive compositions X of the invention is 1.05<RHalk≤1.30. In another alternative, the value of RHalk in the curable silicone adhesive compositions X of the invention is 1.15≤RHalk≤1.30. In another alternative, the value of RHalk in the curable silicone adhesive compositions X is 1.15≤RHalk≤1.25.

In addition to the RHalk value, the molar percentage of hydrogen atoms directly bonded to a silicon atom in the diorganohydrogensiloxy-terminated diorganopolysiloxane CE to the hydrogen atoms directly bonded to a silicon atom in both CE and in the organosilicon crosslinker H-XL (i.e., the RHCE value) is another important feature of the curable silicone adhesive compositions X of the invention.

The molar percentage RHCE can be determined using the formula:

RHCE=$n$HCE/($n$HCE+$n$HXL)×100 in which:
nHCE is the number of moles of hydrogen atom directly bonded to a silicon atom in the diorganohydrogensiloxy-terminated diorganopolysiloxane CE, and
nHXL is the number of moles of hydrogen atom directly bonded to a silicon atom in the organosilicon crosslinker H-XL.

According to one embodiment, the value of RHCE is advantageously within the range of 85%≤RHCE≤100%, preferably 90%≤RHCE≤100%, more preferably 90%≤RHCE≤99.5%.

In addition to the RHalk and RHCE values, the molar percentage of alkenyl groups directly bonded to a silicon atom in the alkenyl group-containing organopolysiloxane A to the alkenyl groups directly bonded to a silicon atom in the total composition X (i.e., the RAlkA value) is another important feature of the curable silicone adhesive compositions X of the invention.

The molar percentage RAlkA can be determined using the formula:

RAlkA=($n$AlkA/$t$Alk)×100 in which:
nAlkA is the number of moles of alkenyl groups directly bonded to a silicon atom in the alkenyl group-containing organopolysiloxane A, and
tAlk is the number of moles of alkenyl groups directly bonded to a silicon atom in the curable silicone composition X.

The value of RAlkA is advantageously within the range of 80%≤RAlkA<95%, 85%≤RAlkA<95%, 86%≤RAlkA≤93%, 87%≤RAlkA≤92%, or 87%≤RAlkA≤91%.

The curable silicone adhesive composition X of the invention further comprises at least one addition reaction catalyst C. The addition reaction catalyst C can be included at any amount capable of curing the composition. For example, the addition reaction catalyst C can be included at an amount where the quantity of a platinum group metal in catalyst C is from 0.01 to 500 parts per weight per 1,000,000 parts by weight of the alkenyl group-containing organopolysiloxane A and diorganoalkenylsiloxy-terminated diorganopolysiloxane gum crosslinker Alk-XL.

The catalyst C may notably be chosen from compounds of platinum and rhodium. It is possible, in particular, to use platinum complexes and an organic product described in U.S. Pat. Nos. 3,159,601, 3,159,602, 3,220,972 and European patents EP-A-0 057 459, EP-A-0 118 978 and EP-A-0 190 530, complexes of platinum and vinylorganosiloxanes described in U.S. Pat. Nos. 3,419,593, 3,715,334, 3,377,432 and 3,814,730. In a preferred embodiment, the addition reaction catalyst C is a platinum group metal-containing catalyst.

The curable silicone adhesive composition X further comprises at least one reinforcing mineral filler F1. In a preferred embodiment, the at least one reinforcing mineral filler F1 is ground quartz, preferably natural ground silicon dioxide with a particle size of approximately 5 μm.

In some embodiments, the at least one reinforcing mineral filler F1 is selected from silicas and/or aluminas, preferably selected from silicas.

As silicas that may be used, fillers are envisaged characterized by a fine particle size often less than or equal to 0.1 μm and a high ratio of specific surface area to weight, generally lying within the range of approximately 50 square meters per gram to more than 300 square meters per gram. Silicas of this type are commercially available products and are well known in the art of the manufacture of adhesive silicone compositions. These silicas may be colloidal silicas, silicas prepared pyrogenically (silicas called combustion or fumed silicas) or by wet methods (precipitated silicas) of mixtures of these silicas.

Cuts of various silicas may of course also be used.

These silica powders have a mean particle size generally close to or equal to 0.1 μm and a BET specific surface area 5 greater than 50 m²/g, preferably between 50 and 400 m²/g, notably between 150 and 350 m²/g.

These silicas are optionally:
pretreated with the aid of at least one compatibilizing agent chosen from the group of molecules that satisfy at least two criteria:
have a high interaction with silica in the region of its hydrogen bonds with itself and with the surrounding silicone oil;
are themselves, or their degradation products, easily removed from the final mixture by heating under vacuum in a gas flow, and compounds of low molecular weight are preferred;

and/or treated in situ:
in a specific manner with the aid of at least one silica, and/or in a complementary manner by using at least one compatibilization agent of nature similar to that which can be used in pre-treatment and as defined above.

In situ treatment of the silica filler is understood to mean putting the filler and the compatibilizing agent in the presence of at least one portion of the preponderant silicone polymer A referred to above.

The compatibilizing agent is chosen according to the treatment method (pre-treatment or in situ) and may for example be selected from the group comprising:
chlorosilanes,
polyorganocyclosiloxanes, such as octamethylcyclosiloxane (D4),
silazanes, preferably disilazanes, or mixtures thereof, hexamethyldisilazane (HMDZ) being the preferred silazane and that may be associated with divinyltetramethyldisilazane,
organopolysiloxanes having, per molecule, one or more hydroxyl groups linked to silicon,
amines such as ammonia or alkylamines with a low molecular weight such as diethylamine,
organic acids with a low molecular weight such as formic or acetic acids,
and mixtures thereof.

In some embodiments, the treated fumed silica contains between 0 and 0.7% of reactive alkenyl groups, such as vinyl groups, coming from the compatibilizing agent.

In a preferred embodiment, the compatibilizing agent does not contain reactive alkenyl groups, such as vinyl groups.

In the case of in situ treatment, the compatibilizing agent is preferably used in the presence of water.

For more details in this respect, reference may be made for example to patent FR-B-2 764 894.

As a variant, it is possible to use compatibilizing methods of the prior art providing early treatment by silazane (e.g. FR-A-2 320 324) or a delayed treatment (e.g. EP-A-462 032).

As a reinforcing alumina that may be used as the filler F1, a highly dispersible alumina is advantageously employed, doped or not in a known manner. It is of course possible also to use cuts of various aluminas. As a non-limiting examples of such aluminas, reference may be made to aluminas A 125, CR 125, D 65CR from the Baikowski Company.

Preferably, the at least one reinforcing mineral filler F1 is ground quartz and/or treated fumed silica. When treated fumed silica is included, preferably the treated fumed silica does not comprise any reactive vinyl groups.

As regards weight, it is preferred to employ a quantity of reinforcing mineral filler F1 of between 5 and 50%, preferably between 10 and 40%, more preferably between 12 and 30% by weight based on all the constituents of the composition X. In some embodiments, the reinforcing mineral filler F1 is a combination of ground quartz in an amount between 3 and 20% by weight, preferably between 4 and 12% by weight, (based on all constituents of the composition X) and treated fumed silica in an amount between 10 and 20% by weight (based on all constituents of the composition X).

The use of a complementary filler F2 such as a thermally conductive filler and/or an electrically conductive filler may be envisaged according to the invention.

The curable silicone adhesive compositions X of the invention may also contain at least one cure rate modifier G. The cure rate modifier G may be a crosslinking inhibitor G1 and/or a crosslinking retardant G2, for example.

Crosslinking inhibitors are also well known. Examples of crosslinking inhibitors G1 that may be used as the cure rate modifier G include:

organopolysiloxanes, advantageously cyclic and substituted by at least one alkenyl group, tetramethylvinyltetrasiloxane being particularly preferred,
pyridine,
phosphine and organic phosphites,
unsaturated amides,
alkylated maleates,
acetylenic alcohols.

These acetylenic alcohols (cf. FR-B-1 528 464 and FR-A-2 372 874), which form part of the preferred thermal blockers of the hydrosilylation reaction, have the formula:

R—(R')C(OH)—C≡CH in which:
R is a linear or branched alkyl radical, or a phenyl radical;
R' is H or a linear or branched alkyl radical, or phenyl radical;
the radicals R, R' and the carbon atom situated in the alpha position of the triple bond being possibly able to form a ring;
the total number of carbon atoms contained in R and R' being at least 5, preferably 9 to 20.

Said alcohols are preferably chosen from those having a boiling point about 250° C. As examples, mention may be made of:
1-ethynyl-1-cyclohexanol (ECH);
methyl-3 dodecyne-1 ol-3;
trimethyl-3,7,11 dodecyne-1 ol-3;
diphenyl-1,1 propyne-2 ol-1
ethyl-3 ethyl-6 nonyne ol-3;
methyl-3 pentadecyne-1 ol-3.

These alpha-acetylenic alcohols are commercial products.

Such a regulator is present at a maximum of 2,000 ppm, preferably in an amount of from 20 to 50 ppm based on the total weight of organopolysiloxanes A, CE, Alk-XL, and H-XL.

Examples of crosslinking retardants G2 that may be used as the cure rate modifier G include so-called inhibitors for controlling the crosslinking reaction and extending the pot life of the silicone composition. Examples of advantageous crosslinking retardants G2 that may be used as the cure rate modifier G include, for example, vinylsiloxanes, 1,3-divinyltetra-methyldi siloxane, or tetravinyl-tetramethyl-tetracyclosiloxanes. It is also possible to use other known inhibitors, for example ethynylcyclohexanol, 3-methylbutynol, or dimethyl maleate.

The curable silicone adhesive compositions X of the invention may also contain one or more of the following optional components, optionally, at least one rheology modifier H, at least one adhesion promoter I, and/or at least one functional additive for conferring specific properties J.

Examples of rheology modifiers H that may be used include, for example, epoxy functional silanes, poly(aryl) siloxane, polyalkylene glycol, polyester polyols, polyhydric alcohols, dicarboxylic acids, polyester diols, and silicone polyethers such as silicone-polyether block copolymer, free polyether, and mixtures thereof, such as, for example BLUESIL SP-3300 (Siloxanes and Silicones; di-Me, 3-hydroxypropyl Me, ethoxylated propoxylated; Elkem Silicones).

Examples of adhesion promoters I include; for example, epoxy-functional, organotitanates or amino-functional organosilicon. In a preferred embodiment, the adhesion promoter (I) compound is a mixture of:

(I.1) at least one alkoxy organosilane containing, per molecule, at least one C2-C6 alkenyl group,
(I.2) at least one organosilicon compound comprising at least one epoxy radical, and
(I.3) at least one metal chelate M and/or a metal alkoxide of general formula:

M(OJ)n

With:
M being chosen from the group formed by: Ti, Zr, Ge, Li, Mn, Fe, Al and Mg, and
n=valency of M and J=linear or branched Ci-Ce alkyl.

According to the invention, an advantageous combination for the adhesion promoter is as follows:
vinyltrimethoxysilane (VTMO), representative of formula (I.1),
3-glycidoxypropyltrimethoxysilane (GLYMO), representative of formula (I.2), and
butyltitanate, representative of formula (I.3).

Examples of additives J that may be used include organic dyes or pigments, stabilizers introduced in silicone rubbers in order to improve heat stability, resistance against hot air, reversion, depolymerisation under attack of traces of acids or water at high temperature. Plasticizers, or release oils, or hydrophobicizing oils, such as polydimethylsiloxane oils, without reactive alkenyl or SiH groups. Mold-release such as fatty acid derivatives or fatty alcohol derivatives, fluoroalkyl. Compatibilizer such as hydroxylated silicone oils.

The curable silicone adhesive compositions X may be cured at any suitable temperature by any suitable method. For example, the curable silicone adhesive compositions X may be cured at room temperature (approximately 20-25° C.) or at higher temperatures. In some embodiments, the curable silicone adhesive compositions X may be cured at 50° C. or higher, at 80° C. or higher, at 100° C. or higher, at 120° C. or higher, at 150° C. or higher. In some embodiments, the curable silicone adhesive compositions X are cured at room temperature upon mixing.

The curing reaction may proceed for any length of time necessary to obtain a suitable cured silicone adhesive elastomer Z according to the invention. One of skill in the art will immediately appreciate that the length of the reaction may vary depending on the temperature of the reaction among other variables. In some embodiments, the curable silicone adhesive compositions X are cured for about one day at room temperature. In other embodiments, the curable silicone adhesive compositions X are cured for about five minutes at 100° C. In some embodiments, the curable silicone adhesive compositions X are cured for about two minutes at about 80° C.

The cured silicone adhesive elastomers Z of the invention exhibit an elongation-at-break value of at least 1200% as measured by any standard test known in the art, such as ASTM D-412. Alternatively, the cured silicone adhesive elastomers Z of the invention exhibit an elongation-at-break value of at least 1300%, at least 1400%, at least 1500%, at least 1600%, at least 1700%, at least 1800%, at least 1900%, or at least 2000%.

In some embodiments, the cured silicone adhesive elastomers Z of the invention exhibit an elongation-at-break value of up to 5000%. Alternatively, the cured silicone elastomers Z of the invention exhibit an elongation-at break value of up to 4000%, up to 3000%, up to 2500%, or up to 2000%.

In some embodiments, the cured silicone adhesive elastomers Z of the invention exhibit an elongation-at-break value of from 1200% to 5000%. In other embodiments, the cured silicone elastomers Z of the invention exhibit an elongation-at-break value of from 1200% to 1400%, from 1200% to 1500%, from 1200% to 1600%, from 1200% to 1700%, from 1200% to 1800%, from 1200% to 2000%, from 1200% to 2500%, from 1200% to 3000%, from 1200% to 4000%, or from 1200% to 5000%. In other embodiments, the cured silicone elastomers Z of the invention exhibit an elongation-at-break value of from 1300% to 1400%, from 1300% to 1500%, from 1300 to 1600%, from 1300% to 1700%, from 1300% to 1800%, from 1300% to 2000%, from 1300% to 2500%, from 1300% to 3000%, from 1300% to 4000%, or from 1300% to 5000%. In other embodiments, the cured silicone elastomers Z of the invention exhibit an elongation-at-break value of from 1400% to 1500%, from 1400% to 1600%, from 1400% to 1700%, from 1400% to 1800%, from 1400% to 2000%, from 1400% to 2500%, from 1400% to 3000%, from 1400% to 4000%, or from 1400% to 5000%. In other embodiments, the cured silicone elastomers Z of the invention exhibit an elongation-at-break value of from 1500% to 2000%, from 1500% to 2500%, from 1500% to 3000%, from 1500% to 4000%, or from 1500% to 5000%. In other embodiments, the cured silicone elastomers Z of the invention exhibit an elongation-at-break value of from 1700% to 2000%, from 1700% to 2500%, from 1700% to 3000%, from 1700% to 4000%, or from 1700% to 5000%. In other embodiments, the cured silicone elastomers Z of the invention exhibit an elongation-at-break value of from 1800% to 2000%, from 1800% to 2500%, from 1800% to 3000%, from 1800% to 4000%, or from 1800% to 5000%. In other embodiments, the cured silicone elastomers Z of the invention exhibit an elongation-at-break value of from 2000% to 2500%, from 2000% to 3000%, from 2000% to 4000%, or from 2000% to 5000%. In other embodiments, the cured silicone elastomers Z of the invention exhibit an elongation-at-break value of from 2500% to 3000%, from 2500% to 4000%, or from 2500% to 5000%.

In some embodiments, the cured silicone adhesive elastomers Z of the invention exhibit a tensile strength of at least about 150 psi (1.03 MPa), at least about 200 psi (1.37 MPa), at least about 250 psi (1.72 MPa), at least about 300 psi (2.06 MPa), or at least about 350 psi (2.41 MPa).

For example, the cured silicone adhesive elastomers Z of the invention may exhibit a tensile strength of from about 150 psi (1.03 MPa) to about 1300 psi (8.96 MPa), from about 150 (1.03 MPa) to about 1200 psi (8.27 MPa), from about 150 (1.03 MPa) to about 1100 psi (7.58 MPa), from about 150 (1.03 MPa) to about 1000 psi (6.89 MPa), from about 150 (1.03 MPa) to about 900 psi (6.21 MPa), from about 150 (1.03 MPa) to about 800 psi (5.52 MPa), from about 150 (1.03 MPa) to about 700 psi (4.83 MPa), from about 150 (1.03 MPa) to about 600 psi (4.13 MPa), from about 200 (1.37 MPa) to about 1300 psi (8.96 MPa), from about 200 (1.37 MPa) to about 1200 psi (8.27 MPa), from about 200 (1.37 MPa) to about 1100 psi (7.58 MPa), from about 200 (1.37 MPa) to about 1000 psi (6.89 MPa), from about 200 (1.37 MPa) to about 900 psi (6.21 MPa), from about 200 (1.37 MPa) to about 800 psi (5.52 MPa), from about 200 (1.37 MPa) to about 700 psi (4.83 MPa), from about 200 (1.37 MPa) to about 600 psi (4.13 MPa), from about 250 psi (1.72 MPa) to about 600 psi (4.13 MPa), from about 300 psi (2.06 MPa) to about 600 psi (4.13 MPa), from about 350 psi (2.41 MPa) to about 600 psi (4.13 MPa), from about 400 psi (2.75 MPa) to about 600 psi (4.13 MPa), from about 450 psi (3.10 MPa) to about 600 psi (4.13 MPa), from about 500 psi (3.44 MPa) to about 600 psi (4.13 MPA), from about 550 psi (3.79 MPa) to about 600 psi (4.13 MPa). In another embodiment, the cured silicone adhesive elastomers Z of the invention exhibit a tensile strength of from about 150 psi (1.03 MPa) to about 200 psi (1.37 MPa), from about 200 psi (1.37 MPa) to about 250 psi (1.72 MPa), from about 250 psi (1.72 MPa) to about 300 psi (2.06 MPa), from about 300 psi (2.06 MPa) to about 350 psi (2.41 MPa), from about 350 psi (2.41 MPa) to about 400 psi (2.75 MPa), from about 400 psi (2.75 MPa) to about 450 psi (3.10 MPa), from about 450 psi (3.10 MPa) to about 500 psi (3.44 MPa), from about 500 psi (3.44 MPa) to about 550 psi (3.79 MPa), or from about 550 psi (3.79 MPa to about 600 psi (4.13 MPa).

In some embodiments, the cured silicone adhesive elastomers Z of the invention exhibit a peel strength of at least 40 N/cm measured according to the peel test method in standard JISK 6854. For example, the cured silicone adhesive elastomers Z of the invention may exhibit a peel strength of from about 40 N/cm to about 85 N/cm measured according to the peel test method in standard JISK 6854.

In some embodiments, the cured silicone adhesive elastomers Z exhibit at least partial cohesive failure. In some embodiments, the cured silicone adhesive elastomers Z of the invention exhibit a cohesive failure of at least 50%, at least 60%, at least 70%, at least 80%, at least 85%, at least 90%, at least 95%, at least 96%, at least 97%, at least 98%, or at least 99%. In some embodiments, the cured silicone adhesive elastomers Z of the invention exhibit a cohesive failure of 100%.

The present invention also related to a method for adhesively bonding at least two substrates S1 and S2, comprising:
  preparing a curable silicone adhesive composition X as described above;
  applying the curable silicone adhesive composition X to at least one of the surfaces of S1 and/or S2 to form at least one adhesively-coated surface;
  assembling the substrates S1 and S2 such that the at least one adhesively-coated surface forms a bond between the at least two substrates S1 and S2;
  optionally applying pressure to the at least one adhesively-coated surface; and
  optionally heating the assembled substrates S1 and S2.

The heating temperature is preferably below 190° C. for a heating time less than 30 minutes. In some embodiments, the heating temperature is about 100° C. for less than 30 minutes, preferably about 20 minutes, more preferably about 10 minutes, 5 minutes, 2 minutes or less. In some embodiments, the heating temperature is about 85° C. for less than 30 minutes, preferably about 20 minutes, more preferably about 15 minutes, 10 minutes, 5 minutes, 2 minutes or less.

The substrates S1 and S2 to be assembled are preferably flexible, and may be chosen from the group comprising textiles, non-woven fibrous substrates, polymer films, in particular polyester, polyamide, polyolefin, polyurethane and silicone polyvinyl chloride. The substrates S1 and S2 may also be made of glass.

According to a variant, at least one of the surfaces of S1 and/or S2 includes silicone, preferably an elastomeric silicone, this silicone advantageously forming a coating for said substrate. The curable silicone adhesive composition X is then applied to the silicone. Such elastomeric silicone compositions are well known to a person skilled in the art and do not require a detailed description.

The curable silicone adhesive composition X according to the invention is applied so as to obtain an adhesive having a thickness of at least 0.1 mm, preferably having a thickness from about 0.3 mm to about 1.5 mm, more preferably having a thickness from about 0.5 mm to about 1.0 mm.

The field of application of the recommended use of the invention is advantageously that of the assembly of inflatable bags for the protection of the occupant of a vehicle that are to be assembled by adhesive bonding and sewing, the substrates S1 and S2 then being the two parts constituting the bag, the curable silicone adhesive composition X according to the invention being applied on at least one of the surfaces of S1 and/or S2 in the region of the stitching.

When the curable silicone adhesive composition X according to the invention is crosslinked by heating, the heating step for said composition X is preferably carried out before sewing the substrates S1 and S2.

The present invention also concerns the use of a curable silicone adhesive composition X as described above as an adhesive and/or as a leakproof joint for the stitching of the two substrates S1 and S2 assembled by sewing. The use of a curable silicone adhesive composition X as described above in the manufacture of an inflatable bag such as an airbag, for example as a joint sealer, is also provided.

The present invention also concerns an inflatable bag for protecting an occupant of a vehicle, consisting of two parts sewn together, adhesively bonded and/or made leakproof in the region of the stitching by a curable silicone adhesive composition X as described above.

Other advantages provided by the present invention will become apparent from the following illustrative examples.

EXAMPLES

Materials and Methods
Preparation of the Silicone Compositions
In the Examples below, the following components were used:
- A1: linear α,ω-vinyl polydimethylsiloxanes (average viscosity of 20000 mPa·s; Mn=49,000 g/mol)
- A2: linear α,ω-vinyl polydimethylsiloxanes (average viscosity of 3500 mPa·s; Mn=27,000 g/mol)
- A3: linear α,ω-vinyl polydimethylsiloxanes (average viscosity of 1000 mPa·s; Mn=18,000 g/mol)
- CE: α,ω-hydride polydimethylsiloxanes (H-PDMS-H) (viscosity of 7-10 mPa·s; Mn=750 g/mol)
- Alk-XL1: vinyldimethyl terminated (vinylmethylsiloxane)-dimethylsiloxane copolymer gum (total vinyl content of 0.04-0.06 weight %; viscosity of >500,000 mPa·s; Mn=220,000 g/mol)
- Alk-XL2: trimethyl terminated (vinylmethylsiloxane)-dimethylsiloxane copolymer gum (total vinyl content of 0.0675-0.0825 weight %; viscosity of >500,000 mPa·s; Mn=220,000 g/mol)
- Alk-XL3: vinyldimethyl terminated polydimethylsiloxane gum (total vinyl content of 0.009-0.017 weight %; viscosity of >500,000 mPa·s; Mn=220,000 g/mol)
- H-XL: trimethyl terminated (methylhydrogensiloxane)-dimethylsiloxane copolymer (viscosity of 6-12 mPa·s; 9.5-11.0% SiH by weight)
- C: platinum catalyst solution: platinum metal diluted in short linear α,ω-vinyl polydimethylsiloxane oils (weight % in platinum=10)
- F1a: ground quartz (MIN-U-SIL® 5)
- F1b: In situ treated hydrophilic fumed silica (AEROSIL® 300 treated with hexamethyldisilazane)
- F1c: In situ treated hydrophilic fumed silica (AEROSIL® 300 treated with hexamethyldisilazane and divinyltetramethyldisilazane)
- G: ECH (1-Ethynyl-1-cyclohexanol)
- H: non hydrolysable silicone polyether copolymer (BLUESIL SP-3300)
- J1: blue pigment
- J2: red pigment Characterization of the Adhesive
a) Dynanometric Properties A cured slab of silicone rubber was fabricated by allowing the silicone adhesive compositions to cure at 25° C. for 24 hours under pressure before testing. The following mechanical properties were evaluated: Durometer Shore A/Shore 00, tensile strength, elongation at break, tear strength and modulus according to the method described in standard ASTM D412. Some cured silicone rubber compositions did not break at the maximum elongation capable of being achieved by the testing equipment. In these cases, elongation at break and tensile strength values were calculated at the maximum elongation achieved and are reported in the tables below with a greater than symbol (>) since the actual elongation at break and tensile strength values could not be calculated.

b) Adhesive Strength

The silicone adhesive composition was applied in the form of a 50 mm-wide strip onto a nylon base material coated with 25 to 35 g/m² of silicone rubber. Then a silicone rubber coated nylon fabric was overlaid on the nylon fabric on which the silicone rubber composition was applied so that the silicone adhesive composition formed a 0.5 to 1 mm thick layer between the silicone rubber coated nylon fabric. The coated base material underwent a 24-hour cure at 25° C. Then, adhesive strength to silicone rubber was measured according to the peel test method in standard JISK 6854 by subjecting the obtained silicone rubber-coated nylon tape to a T-shaped peeling test at a peeling speed of 4 in/min. The load (peeling force or peeling strength) was also measured. The type of break obtained was also noted as a percentage, whether adhesive or cohesive A/C.

Example 1—Exemplary Compositions of the Invention

Three compositions according to the invention described in Table 1 were prepared by mixing parts A & B in a 1:1 weight ratio and curing for 1 day at room temperature. The resulting cured silicone adhesive elastomers Z were tested using the standard ASTM D-412 and standard JISK 6854 as described above.

TABLE 1

| Examples | Ex. 1 | Ex. 2 | Ex. 3 |
|---|---|---|---|
| RHalk | 1.175 | 1.20 | 1.175 |
| RHCE | 100 | 90 | 95.5 |
| RAlKA | 87 | 91 | 92 |
| Part A (weight %) | | | |
| A1 | 33.4 | 36.6 | 33.53 |
| A2 | 18.93 | — | — |
| A3 | — | 21.00 | 19.37 |
| Alk-XL1 | 17.87 | 18.71 | 17.13 |
| C | 0.038 | 0.090 | 0.090 |
| F1a | 11.89 | 3.99 | 11.99 |
| F1b | 17.8 | 19.51 | 17.88 |
| H | 0.074 | 0.100 | 0.025 |
| Part B (weight %) | | | |
| A1 | 33.37 | 36.71 | 33.53 |
| A2 | 15.19 | — | — |
| A3 | — | 16.64 | 14.90 |
| CE | 3.73 | 3.840 | 4.38 |
| Alk-XL1 | 17.85 | 18.76 | 17.10 |
| H-XL | — | 0.257 | 0.118 |
| F1a | 11.88 | 4.00 | 11.97 |
| F1b | 17.79 | 19.57 | 17.88 |

TABLE 1-continued

| Examples | Ex. 1 | Ex. 2 | Ex. 3 |
|---|---|---|---|
| G | 0.03 | 0.070 | 0.070 |
| H | 0.099 | 0.100 | 0.125 |
| J1 | 0.010 | — | — |
| J2 | — | 0.050 | 0.050 |
| Mechanical properties | | | |
| Elongation-at-Break (%) | >1500 | >1500 | >1455 |
| Tensile Strength (psi) | >369 | >200 | >271 |
| Tear Strength (lb/in) | 78 | | |
| Cohesive Failure (%) | 100 | 100 | 100 |
| Peel Strength (N/cm) | 48 | 45 | 55 |

Example 2—Effect of Varying Organopolysiloxane Gum Crosslinker

Five comparative compositions described in Table 2 were prepared by mixing parts A & B in a 1:1 weight ratio and curing for 1 day at room temperature to test the effect of varying the vinyl content and/or location of vinyl groups in the organopolysiloxane gum crosslinker Alk-XL on the properties of the silicone adhesive. The resulting cured silicone adhesive elastomers Z were tested using the standard ASTM D-412 and standard JISK 6854 as described above.

TABLE 2

| Examples | Ex. 1 | Comp 1 | Comp 2 | Ex. 2 | Comp 3 | Comp 4 | Comp 5 |
|---|---|---|---|---|---|---|---|
| RHalk | 1.175 | 1.172 | 1.175 | 1.20 | 1.20 | 1.20 | 1.175 |
| RHCE | 100 | 100 | 100 | 90 | 90 | 90 | 95.5 |
| RAlkA | 87 | 87 | 98 | 91 | 88 | 96 | 100 |
| Part A (weight %) | | | | | | | |
| A1 | 33.4 | 33.23 | 33.33 | 36.6 | 36.59 | 36.69 | 44.66 |
| A2 | 18.93 | 19.01 | 19.21 | — | — | — | — |
| A3 | — | — | — | 21.00 | 21.03 | 20.85 | 19.46 |
| Alk-XL1 | 17.87 | — | — | 18.71 | — | — | — |
| Alk-XL2 | — | 17.86 | — | — | 18.70 | — | — |
| Alk-XL3 | — | — | 17.86 | — | — | 18.73 | — |
| C | 0.038 | 0.039 | 0.039 | 0.090 | 0.090 | 0.090 | 0.090 |
| F1a | 11.89 | 11.88 | 11.89 | 3.99 | 3.99 | 3.99 | 11.99 |
| F1b | 17.8 | 17.71 | 17.77 | 19.51 | 19.5 | 19.55 | 23.81 |
| H | 0.074 | 0.074 | 0.074 | 0.100 | 0.100 | 0.100 | 0.025 |
| Part B (weight %) | | | | | | | |
| A1 | 33.37 | 33.23 | 33.33 | 36.6 | 36.51 | 36.61 | 44.66 |
| A2 | 15.19 | 14.72 | 15.00 | — | — | — | — |
| A3 | — | — | — | 16.64 | 16.52 | 16.79 | 14.77 |
| CE | 3.73 | 4.46 | 4.00 | 3.84 | 4.40 | 3.95 | 4.58 |
| Alk-XL1 | 17.85 | — | — | 18.76 | — | — | — |
| Alk-XL2 | — | 17.86 | — | — | 18.66 | — | — |
| Alk-XL3 | — | — | 17.86 | — | — | 18.70 | — |
| H-XL | — | — | — | 0.257 | 0.259 | 0.233 | 0.123 |
| F1a | 11.88 | 11.88 | 11.89 | 4.00 | 3.98 | 3.98 | 11.97 |
| F1b | 17.79 | 17.71 | 17.77 | 19.51 | 19.46 | 19.52 | 23.81 |
| G | 0.03 | 0.03 | 0.03 | 0.070 | 0.070 | 0.070 | 0.070 |
| H | 0.099 | 0.099 | 0.099 | 0.100 | 0.100 | 0.100 | 0.125 |
| J1 | 0.010 | 0.010 | 0.010 | — | — | — | — |
| J2 | — | — | — | 0.050 | 0.050 | 0.050 | 0.050 |
| Mechanical properties | | | | | | | |
| Elongation-at-Break (%) | >1500 | >1500 | Did Not Cure | >1500 | >1200 | Did Not Cure | Did Not Cure |
| Tensile Strength (psi) | >369 | >350 | | >200 | >220 | | |
| Tear Strength (lb/in) | 78 | 66 | | | | | |
| Cohesive Failure (%) | 100 | 0 | | 100 | 90 | | |
| Peel Strength (N/cm) | 48 | 35 | | 45 | 31 | | |

As illustrated in Table 2, replacement of the organopolysiloxane gum crosslinker containing end-terminal and internal vinyl groups with a total vinyl content of 0.04-0.06 weight (Alk-XL1) with other organopolysiloxane gums reduced performance of the resulting silicone adhesives. Specifically, both peel strength and cohesive failure was negatively impacted by the use of methyl-terminated gums containing internal vinyl groups with a total vinyl content of 0.0675-0.0825 weight % (Alk-XL2).

Use of gums that are vinyl-terminated with no internal vinyl groups (total vinyl content of 0.009-0.017 weight %; Alk-XL3) or with no vinyl groups (e.g., polydimethylsiloxane gum (viscosity of >500,000 mPa·s; Mn=220,000 g/mol); data not shown) resulted in silicone adhesives that failed to cure.

Similarly, removal of Alk-XL such that the RAlkA value is increased to 100% (Comp 5) resulted in compositions that failed to cure.

Example 3—Effect of Varying Quartz Filler

Three additional exemplary compositions described in Table 3 were prepared by mixing parts A & B in a 1:1 weight ratio and curing for 1 day at room temperature to test the effect of varying the amount of ground quartz filler (Fla). The resulting cured silicone adhesive elastomers Z were tested using the standard ASTM D-412 and standard JISK 6854 as described above.

TABLE 3

| Examples | Ex 4 | Ex 5 | Ex 3 | Ex 6 |
|---|---|---|---|---|
| RHalk | 1.175 | 1.175 | 1.175 | 1.175 |
| RHCE | 95.5 | 95.5 | 95.5 | 95.5 |
| RAlKA | 92 | 92 | 92 | 92 |
| Part A (weight %) | | | | |
| A1 | 38.11 | 36.59 | 33.53 | 30.48 |
| A3 | 22.02 | 21.14 | 19.37 | 17.62 |
| Alk-XL1 | 19.47 | 18.69 | 17.13 | 15.57 |
| C | 0.090 | 0.090 | 0.090 | 0.090 |
| F1a | — | 4.00 | 11.99 | 19.99 |
| F1b | 20.32 | 19.5 | 17.88 | 16.25 |
| H | 0.025 | 0.025 | 0.025 | 0.025 |
| Part B (weight %) | | | | |
| A1 | 38.11 | 36.59 | 33.53 | 30.48 |
| A3 | 16.94 | 16.26 | 14.90 | 13.54 |
| CE | 4.98 | 4.78 | 4.38 | 3.98 |
| Alk-XL1 | 19.43 | 18.65 | 17.10 | 15.54 |
| H-XL | 0.133 | 0.127 | 0.118 | 0.107 |
| F1a | — | 3.99 | 11.97 | 19.96 |
| F1b | 20.32 | 19.5 | 17.88 | 16.25 |
| G | 0.070 | 0.070 | 0.070 | 0.070 |
| H | 0.125 | 0.125 | 0.125 | 0.125 |
| J1 | — | — | — | — |
| J2 | 0.050 | 0.050 | 0.050 | 0.050 |
| Mechanical properties | | | | |
| Elongation-at-Break (%) | >1278 | >1295 | >1455 | >1458 |
| Tensile Strength (psi) | >240 | >239 | >271 | >120 |
| Peel Strength (N/cm) | 44 | 60 | 55 | 40 |

As illustrated in Table 3, there is a clear improvement in the mechanical properties of the cured silicone adhesive elastomers when ground quartz (Fla) is added. An optimum could be reached.

Additionally, compositions comprising ground quartz demonstrate superior peel strength compared to compositions in which ground quartz (Fla) was replaced with calcium carbonate (precipitated calcium carbonate (ALBACAR® 5970)).

Example 4—Effect of Varying Treated Fumed Silica

Two comparative compositions described in Table 4 were prepared by mixing parts A & B in a 1:1 weight ratio and curing for 1 day at room temperature to test the effect of varying the treatment of the fumed silica. The resulting cured silicone adhesive elastomers Z were tested using the standard ASTM D-412 and standard JISK 6854 as described above.

TABLE 4

| Examples | Ex. 1 | Comp 6 | Ex. 2 | Comp 7 |
|---|---|---|---|---|
| RHalk | 1.175 | 1.175 | 1.20 | 1.20 |
| RHCE | 100 | 100 | 90 | 90 |
| RAlKA | 87 | 47 | 91 | 52 |
| Part A (weight %) | | | | |
| A1 | 33.4 | 31.83 | 36.6 | 35.16 |
| A2 | 18.93 | 20.24 | — | — |
| A3 | — | — | 21.00 | 22.20 |
| Alk-XL1 | 17.87 | 17.81 | 18.71 | 18.41 |
| C | 0.038 | 0.039 | 0.090 | 0.090 |
| F1a | 11.89 | 11.85 | 3.99 | 3.99 |
| F1b | 17.8 | — | 19.51 | — |
| F1c | — | 18.16 | — | 20.06 |
| H | 0.074 | 0.074 | 0.100 | 0.100 |
| Part B (weight %) | | | | |
| A1 | 33.37 | 31.82 | 36.71 | 35.88 |
| A2 | 15.19 | 13.06 | — | — |
| A3 | — | — | 16.64 | 14.90 |
| CE | 3.73 | 7.14 | 3.84 | 7.15 |
| Alk-XL1 | 17.86 | 17.80 | 18.76 | 18.34 |
| H-XL | — | — | 0.257 | 0.417 |
| F1a | 11.88 | 11.85 | 4.00 | 3.97 |
| F1b | 17.79 | — | 19.57 | — |
| F1c | — | 18.15 | — | 19.13 |
| G | 0.03 | 0.03 | 0.07 | 0.07 |
| H | 0.099 | 0.099 | 0.100 | 0.099 |
| J1 | 0.010 | 0.049 | — | — |
| J2 | — | — | 0.050 | 0.050 |
| Mechanical properties | | | | |
| Elongation-at-Break (%) | >1500 | Did Not Cure | >1500 | 900 |
| Tensile Strength (psi) | >369 | | >200 | 365 |
| Tear Strength (lb/in) | 78 | | | |
| Cohesive Failure (%) | 100 | | 100 | 0 |
| Peel Strength (N/cm) | 48 | | 45 | 26 |

As illustrated in Table 4, use of fumed silica treated with both hexamethyldisilazane and divinyltetramethyldisilazane (Plc) leads to a RAlkA<80% and negatively impacted the mechanical properties of the resulting silicone adhesives. Thus, it appears that the presence of vinyl groups on the fumed silica negatively affects the adhesive properties on the resulting compositions.

Example 5—Effect of Varying RHalk Value

Three comparative compositions and three further exemplary compositions described in Table 5 were prepared by mixing parts A & B in a 1:1 weight ratio and curing for 1 day at room temperature to test the effect of varying the RHalk value. The resulting cured silicone adhesive elastomers Z were tested using the standard ASTM D-412 and standard JISK 6854 as described above.

TABLE 5

| Examples | Comp 8 | Ex 7 | Ex 8 | Ex 3 | Ex 9 | Comp 9 | Comp 10 |
|---|---|---|---|---|---|---|---|
| RHalk | 1.4 | 1.3 | 1.2 | 1.175 | 1.15 | 1.05 | 0.7 |
| RHCE | 95.5 | 95.5 | 95.5 | 95.5 | 95.5 | 95.5 | 95.5 |
| RAlkA | 92 | 92 | 92 | 92 | 92 | 92 | 92 |
| Part A (weight %) | | | | | | | |
| A1 | 33.38 | 33.44 | 33.52 | 33.53 | 33.55 | 33.63 | 33.88 |
| A3 | 19.72 | 19.57 | 19.42 | 19.37 | 19.34 | 19.19 | 18.66 |
| Alk-XL1 | 17.05 | 17.08 | 17.12 | 17.13 | 17.14 | 17.17 | 17.31 |
| C | 0.090 | 0.090 | 0.090 | 0.090 | 0.090 | 0.090 | 0.090 |
| F1 | 11.99 | 11.99 | 11.99 | 11.99 | 11.99 | 11.99 | 12.00 |
| F3 | 17.79 | 17.89 | 17.86 | 17.88 | 17.89 | 17.92 | 18.06 |
| H | 0.025 | 0.025 | 0.025 | 0.025 | 0.025 | 0.025 | 0.025 |
| Part B (weight %) | | | | | | | |
| A1 | 33.38 | 33.44 | 33.52 | 33.53 | 33.55 | 33.55 | 33.88 |
| A3 | 14.42 | 14.62 | 14.84 | 14.90 | 14.95 | 15.20 | 15.93 |
| CE | 5.19 | 4.84 | 4.47 | 4.38 | 4.29 | 3.93 | 2.64 |
| Alk-XL1 | 17.01 | 17.05 | 17.09 | 17.10 | 17.11 | 17.06 | 17.28 |
| H-XL | 0.139 | 0.129 | 0.120 | 0.118 | 0.116 | 0.105 | 0.071 |
| F1a | 11.97 | 11.97 | 11.97 | 11.97 | 11.97 | 12.00 | 11.98 |
| F1b | 17.79 | 17.89 | 17.86 | 17.88 | 17.89 | 17.89 | 18.06 |
| G | 0.070 | 0.070 | 0.070 | 0.070 | 0.070 | 0.070 | 0.070 |
| H | 0.125 | 0.125 | 0.125 | 0.125 | 0.125 | 0.125 | 0.125 |
| J2 | 0.050 | 0.050 | 0.050 | 0.050 | 0.050 | 0.050 | 0.050 |
| Mechanical properties | | | | | | | |
| Elongation-at-Break (%) | >1286 | >1200 | >1448 | >1455 | >1382 | 1248 | Did Not Cure |
| Tensile Strength (psi) | >288 | >387 | >255 | >271 | >223 | 22 | |
| Cohesive Failure (%) | 29 | 100 | 100 | 100 | 100 | 100 | |
| Peel Strength (N/cm) | 54 | 82 | 62 | 55 | 40 | 8 | |

As illustrated in Table 5, increasing the molar ratio of hydrogen atoms to alkenyl groups within the silicone composition (RHalk) to 1.40 negatively impacted the mechanical properties of the resulting silicone adhesives. Similarly, decreasing the molar ratio of hydrogen atoms to alkenyl groups within the silicone composition (RHalk) to 1.05 or lower negatively impacted the mechanical properties of the resulting silicone adhesives.

Example 6—Effect of Cure Temperature/Time

Two exemplary silicone adhesive compositions of the invention were applied in the form of a 50 mm-wide strip onto a nylon base material coated with 25 to 35 g/m² of silicone rubber and then a silicone rubber coated nylon fabric was overlaid on the nylon fabric on which the silicone rubber composition was applied so that the silicone adhesive composition formed a 0.5 to 1 mm thick layer between the silicone rubber coated nylon fabric as described in the above examples. However, instead of curing the compositions for 24 hours and 25° C., the compositions were cured for 20 minutes at 85° C. Then, adhesive strength to silicone rubber was measured as described above.

Both of the tested exemplary silicone adhesive elastomers cured for 20 minutes at 85° C. displayed 100% cohesive failure and a peel strength of greater than 40 N/cm, demonstrating that the silicone adhesive compositions of the invention can be rapidly cured by a relatively modest increase in temperature without compromising the adhesive properties of the resulting compositions.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

We claim:

1. A curable silicone composition X comprising:
   A) at least one alkenyl group-containing organopolysiloxane A having at least two silicon-bonded $C_2$ to $C_{20}$ alkenyl groups per molecule,
   (B) at least one diorganohydrogensiloxy-terminated diorganopolysiloxane chain extender CE,
   (C) at least one diorganoalkenylsiloxy-terminated diorganopolysiloxane gum crosslinker Alk-XL containing at least 3 silicon-bonded $C_2$ to $C_{20}$ alkenyl groups per molecule, (D) optionally, at least one organosilicon crosslinker H-XL containing at least 3 silicon-bonded hydrogen atoms per molecule,
(E) at least one addition reaction catalyst C,
(F) at least one reinforcing mineral filler F1,
(G) optionally, at least one complementary filler F2,
(H) optionally, at least one cure rate modifier G,
(I) optionally, at least one rheology modifier H,
(J) optionally, at least one adhesion promoter I, and
(K) optionally, at least one functional additive for conferring specific properties J;
wherein the at least one diorganoalkenylsiloxy-terminated diorganopolysiloxane gum crosslinker Alk-XL containing at least 3 silicon-bonded $C_2$ to $C_{20}$ alkenyl groups per molecule has a total alkenyl content of from 0.02 to 0.10 weight %; and
wherein the amounts of the alkenyl group-containing organopolysiloxane A, the diorganohydrogensiloxy-terminated diorganopolysiloxane CE, the diorganohydrogensiloxy-terminated diorganopolysiloxane gum crosslinker Alk-XL, and the optional organosilicon crosslinker H-XL are determined such that:
1) The value of the ratio RHalk is 1.05<RHalk<1.40, wherein RHalk=nH/tAlk, and wherein:
   a) nH is the number of moles of hydrogen atom directly bonded to a silicon atom in the curable silicone composition X; and
   b) tAlk is the number of moles of alkenyl groups directly bonded to a silicon atom in the curable silicone composition X,
2) the % molar ratio RHCE is within the range of 90%≤RHCE≤100%, wherein RHCE=nHCE/(nHCE+nHXL)×100, and wherein:
   a) nHCE is the number of moles of hydrogen atom directly bonded to a silicon atom in the diorganohydrogensiloxy-terminated diorganopolysiloxane CE, and
   b) nHXL is the number of moles of hydrogen atom directly bonded to a silicon atom in the organosilicon crosslinker H-XL, and
3) the % molar ratio RAlkA is within the range of 80%≤RAlkA<95%, wherein RAlkA=(nAlkA/tAlk)×100, and wherein:
   a) nAlkA is the number of moles of alkenyl groups directly bonded to a silicon atom in the organopolysiloxane A, and
   b) tAlk is the number of moles of alkenyl groups directly bonded to a silicon atom in the curable silicone composition X.

2. The curable silicone composition X according to claim 1, wherein said at least one alkenyl group-containing organopolysiloxane A having at least two silicon-bonded $C_2$ to $C_{20}$ alkenyl groups per molecule is of the following formula (1):

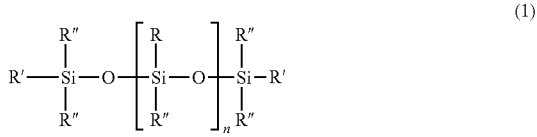

wherein:
n is an integer ranging from 1 to 1000,
R is independently selected from a $C_1$ to $C_{20}$ alkyl group such as a methyl, ethyl, propyl, or a $C_6$ to $C_{12}$ aryl group such as a xylyl, tolyl, or phenyl group, or is a $C_2$ to $C_{20}$ alkenyl group, such as a vinyl, allyl, hexenyl, decenyl, or tetradecenyl group,
R' is independently selected from a $C_2$ to $C_{20}$ alkenyl group such as a vinyl, allyl, hexenyl, decenyl, or tetradecenyl group, and
R" is independently selected from a $C_1$ to $C_{20}$ alkyl group such as a methyl, ethyl, propyl, or a $C_6$ to $C_{12}$ aryl group such as a xylyl, tolyl, or phenyl group.

3. The curable silicone composition X according to claim 1, wherein said at least one alkenyl group-containing organopolysiloxane A having at least two silicon-bonded $C_2$ to $C_{20}$ alkenyl groups per molecule is of the following formula (1):

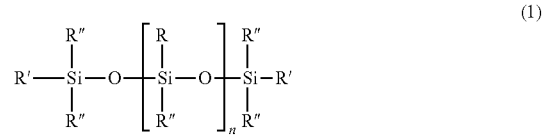

wherein:
n is an integer ranging from 1 to 1000,
R is a methyl group,
R' is a vinyl group, and
R" is a methyl group.

4. The curable silicone composition X according to claim 1, wherein the at least one diorganohydrogensiloxy-terminated diorganopolysiloxane chain extender CE is of the following formula (2):

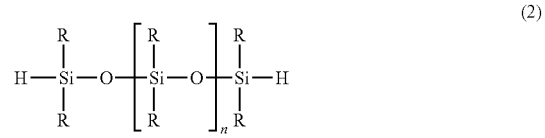

wherein:
R is independently selected from a $C_1$ to $C_{20}$ alkyl group, or a $C_6$ to $C_{12}$ aryl group such as a xylyl, tolyl, or phenyl group, and
n is an integer ranging from 1 to 500.

5. The curable silicone composition X according to claim 1, wherein the at least one diorganoalkenylsiloxy-terminated diorganopolysiloxane gum crosslinker Alk-XL containing at least 3 silicon-bonded $C_2$ to $C_{20}$ alkenyl groups per molecule comprises:
at least three siloxy units of formula (A-3):

wherein the symbol "Alk" represents a $C_2$ to $C_{20}$ alkenyl group, such as a vinyl, allyl, hexenyl, decenyl, or tetradecenyl group, and the symbol R represents a $C_1$ to $C_{20}$ alkyl group, such as a methyl, ethyl, propyl, or a $C_6$-$C_{12}$ aryl group such as a xylyl, tolyl, or phenyl group, in which each instance of "Alk" and R can be the same or different, and
wherein h=1 or 2, and
other siloxy units of formula (A-2):

in which the symbol L represents a $C_1$ to $C_{20}$ alkyl group, such as a methyl, ethyl, propyl, or a $C_6$-$C_{12}$ aryl group such as a xylyl, tolyl, or phenyl group, and the symbol g is equal to 2, in which each instance of L can be the same or different.

6. The curable silicone composition X according to claim 1, wherein the at least one diorganoalkenylsiloxy-terminated diorganopolysiloxane gum crosslinker Alk-XL containing at least 3 silicon-bonded $C_2$ to $C_{20}$ alkenyl groups per molecule comprises:

at least three siloxy units of formula (A-3):

$$(Alk)(R)_n SiO_{(3-h)/2} \quad (A-3)$$

wherein the symbol "Alk" represents a vinyl group, and the symbol R represents a methyl group, and
wherein h=1 or 2, and
other siloxy units of formula (A-2):

$$(L)_g SiO_{(4-g)/2} \quad (A-2)$$

in which the symbol L represents a methyl group, and the symbol g is equal to 2.

7. The curable silicone composition X according to claim 1, wherein the at least one diorganoalkenylsiloxy-terminated diorganopolysiloxane gum crosslinker Alk-XL containing at least 3 silicon-bonded $C_2$ to $C_{20}$ alkenyl groups per molecule is a vinyl terminated (vinylmethylsiloxane)-dimethylsiloxane copolymer gum with a total vinyl content of from 0.020 to 0.065 weight %.

8. The curable silicone composition X according to claim 1, wherein the at least one organosilicon crosslinker H-XL containing at least 3 silicon-bonded hydrogen atoms per molecule is present and comprises:

(i) at least 3 siloxy units of formula (XL-1) which may be identical or different:

$$(H)(Z)_e SiO_{(3-e)/2} \quad (XL-1)$$

wherein:
the symbol H represents a hydrogen atom,
the symbol Z represents an alkyl having from 1 to 8 carbon atoms inclusive, and
the symbol e is equal to 0, 1 or 2; and (ii) at least one, and optionally from 1 to 550 of siloxy unit(s) of formula (XL-2):

$$(Z)_g SiO_{(4-g)/2} \quad (XL-2)$$

wherein:
the symbol Z represents an alkyl having from 1 to 8 carbon atoms inclusive, or a $C_6$-$C_{12}$ aryl group such as a xylyl, tolyl, or phenyl group, and
the symbol g is equal to 0, 1, 2 or 3;
wherein Z in XL-1 and XL-2 can be the same or different.

9. The curable silicone composition X according to claim 8, wherein the at least one organosilicon crosslinker H-XL comprises from 3 to 60 siloxy units of formula (XL-1) and from 1 to 250 siloxy unit(s) of formula (XL-2).

10. The curable silicone composition X according to claim 1, wherein the catalyst C is a platinum group metal-containing catalyst.

11. The curable silicone composition X according to claim 1, wherein the at least one reinforcing mineral filler F1 is selected from the group consisting of ground quartz, fumed silica, and mixtures thereof.

12. The curable silicone composition X according to claim 1, wherein the at least one reinforcing mineral filler F1 is fumed silica treated using at least one compatibilization agent in the presence of at least one portion of the at least one alkenyl group-containing organopolysiloxane A.

13. The curable silicone composition X according to claim 12, wherein the at least one compatibilization agent does not comprise reactive alkenyl groups.

14. The curable silicone composition X according to claim 12, wherein the at least one reinforcing mineral filler F1 further comprises ground quartz.

15. The curable silicone composition X according to claim 1, wherein the value of the ratio RHalk is 1.15≤RHalk≤1.30.

16. The curable silicone composition X according to claim 1, wherein the % molar ratio RAlkA is within the range of 86%≤RAlkA≤93%.

17. The curable silicone composition X according to claim 1, wherein when the curable silicone composition X is cured, yields a silicone elastomer Z having an elongation-at-break value of at least 1200% measured according to ASTM D-412.

18. The curable silicone composition X according to claim 1, wherein when the curable silicone composition X is cured, yields a silicone elastomer Z having a peel strength of at least 40 N/cm measured according to JISK 6854.

19. An inflatable bag for protecting an occupant of a vehicle, consisting of two parts sewn together, adhesively bonded and/or made leakproof in the region of the stitching by a curable silicone composition X according to claim 1.

20. A method for adhesively bonding at least two substrates S1 and S2, comprising:
preparing a curable silicone composition X according to claim 1;
applying the curable silicone composition X to at least one of the surfaces of S1 and/or S2 to form at least one adhesively-coated surface;
assembling the substrates S1 and S2 such that the at least one adhesively-coated surface forms a bond between the at least two substrates S1 and S2;
optionally applying pressure to the at least one adhesively-coated surface; and
optionally heating the assembled substrates S1 and S2.

* * * * *